(12) United States Patent
Kim et al.

(10) Patent No.: US 11,480,821 B2
(45) Date of Patent: Oct. 25, 2022

(54) DISPLAY APPARATUS

(71) Applicant: SAMSUNG ELECTRONICS CO., LTD., Suwon-si (KR)

(72) Inventors: Ik Hwan Kim, Suwon-si (KR); Kyoung Youn Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/421,294

(22) PCT Filed: Dec. 12, 2019

(86) PCT No.: PCT/KR2019/017640
§ 371 (c)(1),
(2) Date: Jul. 7, 2021

(87) PCT Pub. No.: WO2020/145534
PCT Pub. Date: Jul. 16, 2020

(65) Prior Publication Data
US 2022/0004049 A1  Jan. 6, 2022

(30) Foreign Application Priority Data

Jan. 7, 2019 (KR) .................. 10-2019-0001650

(51) Int. Cl.
*G02F 1/1333* (2006.01)
(52) U.S. Cl.
CPC .. *G02F 1/133322* (2021.01); *G02F 1/133325* (2021.01)
(58) Field of Classification Search
CPC ......... G02F 1/133322; G02F 1/133325; G02F 1/1333; G02F 1/133308; G02F 1/133328; G02F 2201/465
See application file for complete search history.

(56) References Cited

U.S. PATENT DOCUMENTS

| 8,828,842 B2 | 9/2014 | Huang et al. |
| 8,994,148 B2 | 3/2015 | Gratz et al. |

(Continued)

FOREIGN PATENT DOCUMENTS

| JP | 5113345 B2 | 1/2013 |
| KR | 10-2016-0095568 A | 8/2016 |

(Continued)

OTHER PUBLICATIONS

International Search Report dated Apr. 13, 2020, issued by the International Searching Authority in International Application No. PCT/KR2019/017640.

*Primary Examiner* — Michael H Caley
*Assistant Examiner* — Agnes Dobrowolski
(74) *Attorney, Agent, or Firm* — Sughrue Mion, PLLC

(57) ABSTRACT

A display apparatus according to a concept of the disclosure includes: a display panel displaying an image in a front direction; a middle mold causing the display panel to be rested at a first position; and a chassis coupled with the middle mold in the front direction of the display panel, wherein the middle mold includes a restricting rib for restricting the display panel from departing from the first position and restricting the display panel from moving in a side direction, and the chassis includes a pressing rib being in an inclined shape and pressing the display panel toward the first position when the chassis is coupled with the middle mold in the state in which the display panel departs from the first position.

12 Claims, 9 Drawing Sheets

(56) References Cited

U.S. PATENT DOCUMENTS

| | | |
|---|---|---|
| 9,059,167 B2 | 6/2015 | Farooq et al. |
| 9,070,729 B2 | 6/2015 | Ji et al. |
| 9,082,806 B2 | 7/2015 | Lin et al. |
| 9,230,921 B2 | 1/2016 | Ayotte et al. |
| 9,245,801 B2 | 1/2016 | Winter |
| 10,185,079 B2 | 1/2019 | Yoon et al. |
| 10,371,972 B2 | 8/2019 | Shin et al. |
| 2003/0103173 A1* | 6/2003 | Satonaka .......... G02F 1/133615 349/58 |
| 2007/0241993 A1 | 10/2007 | Monden et al. |
| 2016/0377908 A1* | 12/2016 | Shin .................. G02F 1/133308 349/58 |

FOREIGN PATENT DOCUMENTS

| | | |
|---|---|---|
| KR | 10-1688990 B1 | 12/2016 |
| KR | 10-2017-0001361 A | 1/2017 |

\* cited by examiner

DISPLAY APPARATUS

TECHNICAL FIELD

The present disclosure relates to a display apparatus, and more particularly, to a display apparatus including a member for preventing a crack of a display panel.

BACKGROUND ART

Generally, a display apparatus is an apparatus for displaying a screen, and includes a monitor or a television. In display apparatuses, an emissive display panel such as Organic Light-Emitting Diode (OLED) and a non-emissive display panel such as a Liquid Crystal Display (LCD) panel are used.

The disclosure relates to a display module and a display apparatus to which a non-emissive display panel is applied. The display apparatus to which the non-emissive display panel is applied is configured with a display panel being a liquid crystal panel to display a screen, and a backlight unit for supplying light to the display panel, wherein the backlight unit includes a light source module having a light source, and a plurality of optical sheets for receiving light from the light source and guiding the light to the display panel.

The display panel and the backlight unit are supported on a middle mold. When the display apparatus is assembled, a top chassis is coupled with the middle mold in the state in which the display panel is placed on the middle mold so that the display panel is supported on the middle mold.

DISCLOSURE

Technical Problem

An aspect of the disclosure provides a display apparatus including a configuration for preventing a display panel from being damaged when the display apparatus is assembled.

Technical Solution

A display apparatus according to a concept of the disclosure includes: a display panel displaying an image in a front direction; a middle mold causing the display panel to be rested at a first position; and a chassis coupled with the middle mold in the front direction of the display panel, wherein the middle mold includes a restricting rib for restricting the display panel from departing from the first position and restricting the display panel from moving in a side direction, and the chassis includes a pressing rib being in an inclined shape and pressing the display panel toward the first position when the chassis is coupled with the middle mold in the state in which the display panel departs from the first position.

Also, the chassis may include an insertion rib inserted into the middle mold when the chassis is coupled with the middle mold, the middle mold may include a support rib forming a portion of an insertion groove in which the insertion rib is inserted, and the restricting rib may be positioned more adjacent to a side surface of the display panel than the support rib.

Also, the chassis may further include a hook hook-coupled with the middle mold, the middle mold may further include a coupling protrusion positioned on the support rib and hooked with the hook, and the pressing rib may be positioned on the hook.

Also, the hook may further include a hook groove into which the coupling protrusion is inserted when the hook is coupled with the middle mold, and the pressing rib may be formed on the same surface as the hook groove.

Also, the middle mold may include a hook insertion groove which is located inside the insertion groove and in which the hook is inserted, and a guide guiding the pressing rib when the hook is inserted into the hook insertion groove.

Also, the guide may guide the pressing rib to be inserted in a direction of being coupled with the middle mold, when the hook is inserted into the hook insertion groove.

Also, the guide may be formed by cutting a portion of an end of the support rib.

Also, the restricting rib may be positioned more adjacent to a side surface of the display panel than the pressing rib, when the chassis is coupled with the middle mold.

Also, a thickness of the pressing rib may correspond to a thickness of the restricting rib or may be thinner than the thickness of the restricting rib.

Also, the pressing rib may be inclined.

Also, the pressing rib may include an inclined surface inclined such that a thickness of the pressing rib increases in a direction toward the chassis from an end of the pressing rib, and the inclined surface may press, when the chassis is coupled with the middle mold, the display panel positioned out of the first position toward the first position.

Also, when the display panel is located at a second position at which at least one portion of the display panel is placed on a top end of the restricting rib, the pressing rib may press the display panel toward the first position, while being coupled with the middle mold.

Also, the support rib and the guide may be located at corresponding positions in a direction in which the support rib extends.

Also, the middle mold may further include an indicator rib positioned adjacent to the support rib.

Also, the indicator rib may be opposite to the support rib with respect to the insertion groove.

A display apparatus according to a concept of the disclosure includes: a display panel displaying an image in a front direction; a middle mold causing the display panel to be rested thereon; and a chassis coupled with the middle mold in a first direction in the front direction of the display panel, wherein the middle mold includes a restricting rib extending in a second direction that is orthogonal to the first direction and supporting a side surface of the display panel, and the chassis includes a pressing rib having an inclined surface inclined in a third direction that is orthogonal to the first direction and the second direction to press the display panel when the chassis is coupled with the middle mold in the state in which the display panel is placed on a top end of the restricting rib.

Also, a thickness of the pressing rib in the third direction may correspond to a thickness of the restricting rib in the third direction or may be thinner than the thickness of the restricting rib.

Also, the chassis may include an insertion rib that is inserted into the middle mold in the first direction when the chassis is coupled with the middle mold, and a hook further extending in the first direction from an end of the insertion rib and hook-coupled with the middle mold, the middle mold may include a support rib forming a portion of an insertion groove into which the insertion rib is inserted and extending in the second direction, and a coupling protrusion positioned on the support rib and protruding in the third direction to be hooked with the hook, and the pressing rib may extend in the third direction from the hook.

Also, the middle mold may further include a guide cut in the first direction from an end of the support rib and guiding the pressing rib to be inserted in the first direction when the chassis is coupled with the middle mold.

Also, a display apparatus according to a concept of the disclosure includes: a display panel displaying an image in a front direction; a middle mold causing the display panel to be rested thereon; and a chassis coupled with the middle mold in the front direction of the display panel, wherein the middle mold includes a restricting rib supporting a side surface of the display panel, and the chassis includes a pressing rib pressing the display panel out of the restricting rib when the chassis is coupled with the middle mold in the state in which the display panel is placed on a top end of the restricting rib.

Advantageous Effects

According to the disclosure, by including a rib for maintaining a position of a display panel in a top chassis of a display apparatus such that, when the top chassis is assembled with a middle mold, the top chassis is prevented from contacting the display panel to generate a crack in the display panel, a moved position of the display panel may be corrected through the rib, and accordingly, it may be possible to prevent an external force from being applied to the display panel upon coupling of the top chassis and the middle mold.

Also, because the middle mold includes a rib for restricting a movement in position of the display panel and an indicator member for enabling an assembler to check the rib with his/her naked eye upon assembling of the display apparatus, the assembler may check a position of the rib and recheck a position of the display panel according to the checked position of the rib, resulting in high assembly.

MODES OF THE INVENTION

Figure 1:
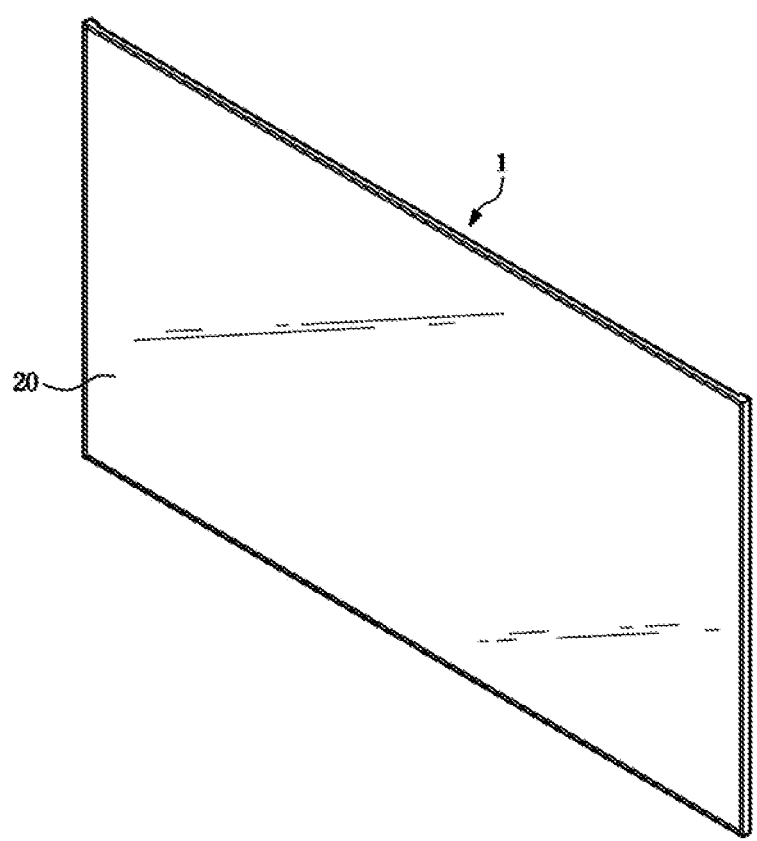
FIG. 1 is a perspective view of a display apparatus according to an embodiment of the disclosure.

Embodiments described in the present specification and configurations illustrated in the drawings are merely preferred examples of the disclosure, and may be modified in various different ways at the time of filing of the present application to replace the embodiments and drawings of the present specification.

Also, like reference numerals or symbols denoted in the drawings of the present specification represent members or components that perform the substantially same functions.

Also, the terms used in the present specification are used to describe the embodiments, not for the purpose of limiting and/or restricting the disclosure. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

Also, it will be understood that, although the terms including ordinal numbers, such as "first", "second", etc., may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, embodiments of the disclosure will be described in detail with reference to the accompanying drawings.

Figure 2:
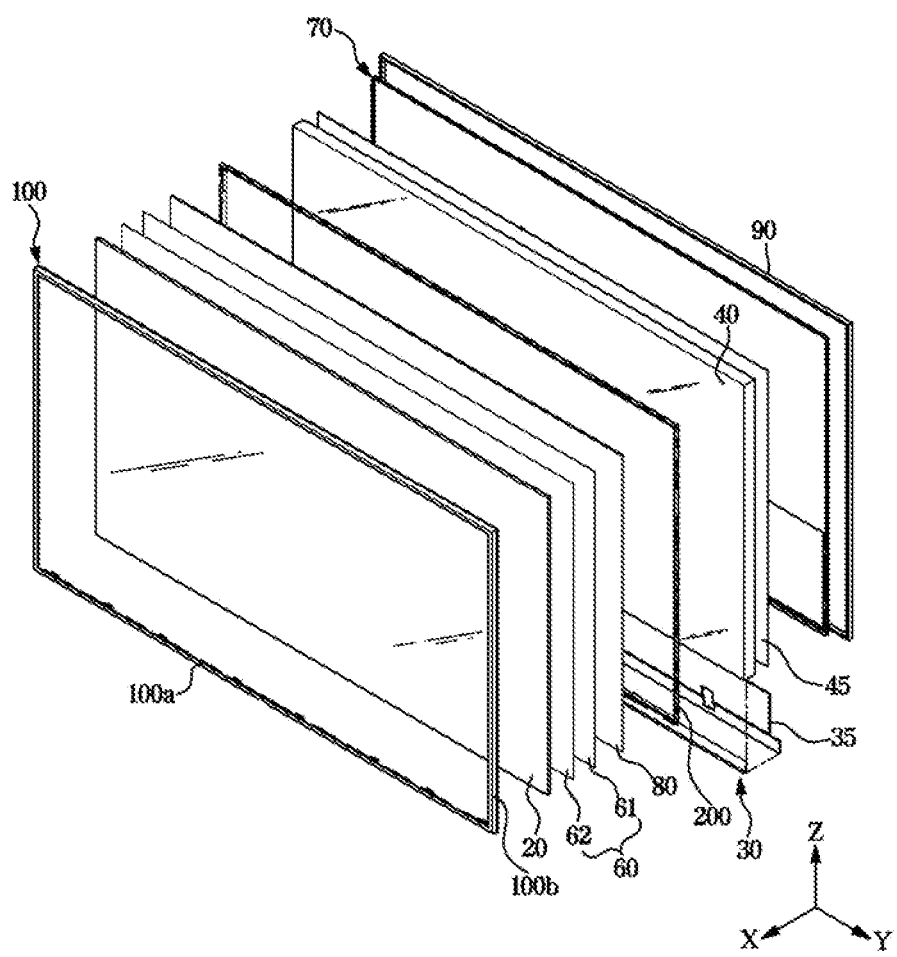
FIG. 2 is an exploded perspective view of a display apparatus according to an embodiment of the disclosure.
Figure 3:
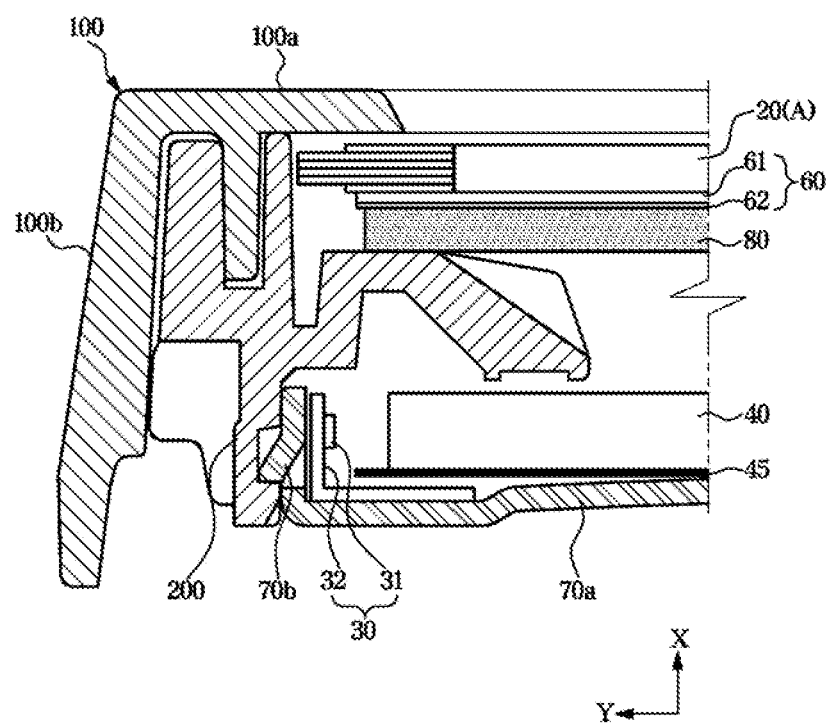
FIG. 3 is a side cross-sectional view illustrating an assembled state of some configurations in a display apparatus according to an embodiment of the disclosure.
Figure 4:
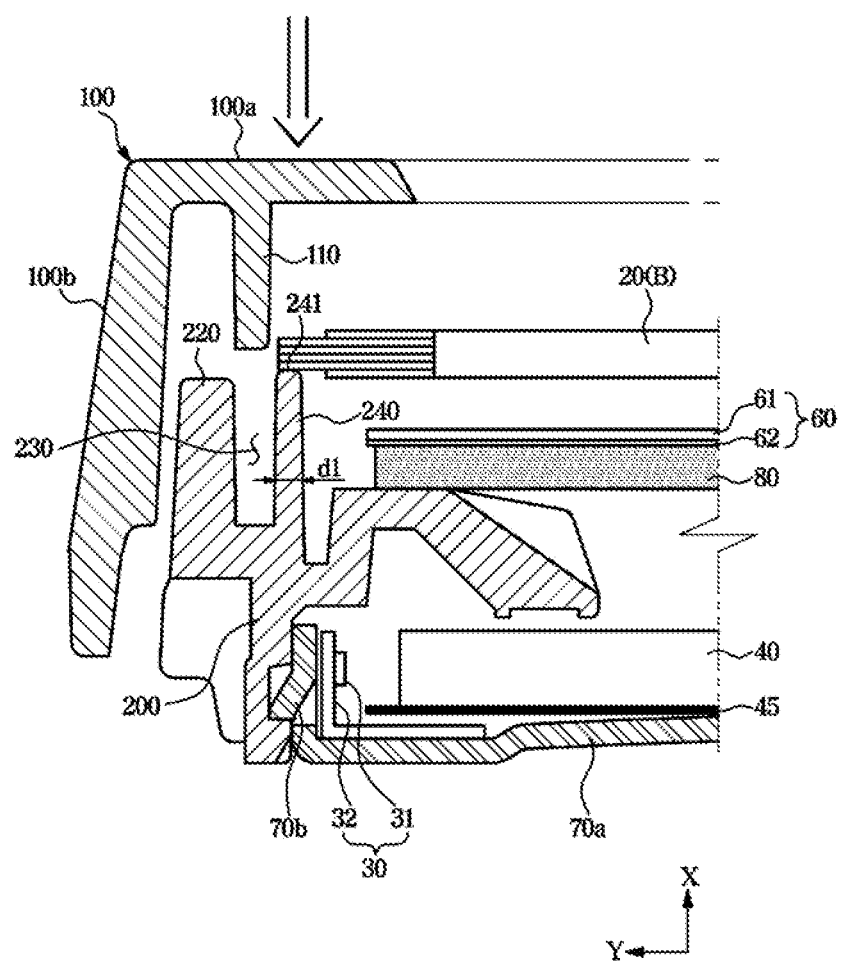
FIG. 4 illustrates a case in which a display panel departs from its position when a display apparatus according to an embodiment of the disclosure is assembled.

FIG. 1 is a perspective view of a display apparatus according to an embodiment of the disclosure, FIG. 2 is an exploded perspective view of a display apparatus according to an embodiment of the disclosure, FIG. 3 is a side cross-sectional view illustrating an assembled state of some configurations in a display apparatus according to an embodiment of the disclosure, and FIG. 4 illustrates a case in which a display panel departs from its position when a display apparatus according to an embodiment of the disclosure is assembled.

Descriptions about the disclosure are given based on an example of a display apparatus 1 being a flat display, however, the descriptions about the disclosure may be also applied to a curved display apparatus or a bendable display apparatus.

Also, the terms 'front direction' and 'front surface' used in the present specification may be based on a front surface of a display panel 20, which is an image display side of the display panel 20, in the display apparatus 1 illustrated in FIG. 1. An 'upper portion' and a 'lower portion' with respect to the 'front direction' and 'front surface' may represent an upper portion and a lower portion of the display apparatus 1 illustrated in FIG. 1, and 'both sides' and 'sides' may represent left and right directions of the display apparatus 1 illustrated in FIG. 1.

Also, a first direction, a second direction, and a third direction used below may represent directivity, and the first direction used below may be used substantially as a meaning including both the first direction and an opposite direction of the first direction.

The display apparatus 1 may include a display module that displays images.

The display module may include the display panel 20 on which images are displayed, and a backlight unit for supplying light to the display panel 20. The backlight unit may include a light source module 30, an optical sheet 60, and a diffuser plate 80. That is, the backlight unit may include the light source module 30 positioned behind the display panel 20, a light guide plate 40 positioned in a space between the display panel 20 and the light source module 30 to transfer light transferred from behind to the display panel 20 positioned in a front direction, the diffuser plate 80 for diffusing light irradiated from the light guide plate 40, the optical sheet 60 having a plurality of layers 61 and 62 positioned behind the display panel 20 to change optical properties, a middle mold 200 supporting the display panel 20 and the light guide plate 40, and a display chassis 100 and 70 forming an outer appearance. The display chassis 100 and 70 may include a top chassis 100 coupled with a front portion of the middle mold 200 to maintain a state in which the display panel 20 is installed in the middle mold 200, and a bottom chassis 70 coupled with a rear portion of the middle mold 200, wherein the light source module 30 is positioned at both sides of the bottom chassis 70 inside the bottom chassis 70.

The light source module 30 may be positioned inside the bottom chassis 70 and irradiate light toward an inner center of the bottom chassis 70. According to an embodiment of the disclosure, the light source module 30 may be positioned in a lower portion of the display module, although not limited thereto. However, the light source module 30 may be applied to any one of the lower portion, a side portion, or an upper portion of the display module, or the light source module 30 may be applied to all sides of the display module along a circumference of the display module.

In the middle mold 200, the diffuser plate 80, the optical sheet 60, the display panel 20, and the top chassis 100 may be installed in this order in the front direction, and the bottom chassis 70 may be installed in a rear direction. The middle mold 200 may maintain a spacing between the display panel 20 and the bottom chassis 70, while supporting the individual components.

The top chassis 100 may include a bezel portion 100*a* covering front edges of the display panel 20, and a top side portion 100*b* bent in the rear direction from edges of the bezel portion 100*a* and covering side surfaces of the middle mold 200.

The bottom chassis 70 may include a rear portion 70*a* forming a rear side of the display module, and a bottom side portion 70*b* extending in the front direction from a circumference of the rear portion 70*a* and coupled into the middle mold 200.

The light source module 30 may include a light source package 31 and a printed circuit board 32.

A light source of the light source package 31 may include a light emitting diode (LED). A plurality of light source packages 31 may be provided, and the plurality of light source packages 31 may be spaced at preset intervals. The plurality of light source packages 31 may be spaced from each other on the printed circuit board 32. The light source module 30 may include a radiating member 35 for radiating heat generated from the light source package 31 and the printed circuit board 38.

The light guide plate 40 may be spaced from the bottom chassis 70, and the light source module 30 may be positioned at both sides (that is, the bottom side portion 70*b*) of a space between the light guide plate 40 and an inner surface of the bottom chassis 70.

The light guide plate 40 may include a reflective member 45 on the rear surface. The reflective member 45 may be provided on the rear surface of the light guide plate 40 such that all light generated from the light source package 31 is directed toward the front surface of the reflective member 45. The reflective member 45, which is a reflective plate, may be configured separately from the light guide plate 40 and positioned on the rear surface of the light guide plate 40, or the reflective member 45 may be integrated into the light guide plate 40. Also, by forming a reflective coating on the rear surface of the light guide plate 40, the same effect described above may be achieved.

The light guide plate 40 may transmit light generated from the light source. For this, the light guide plate 40 may be formed of a transparent resin material. The light guide plate 40 may be spaced a preset distance from the light source to minimize deformation by heat generated from the light source.

Behind the bottom chassis 70, a rear cover 90 covering a rear side of the bottom chassis 70 and forming an outer appearance of the display apparatus 1 may be positioned.

As described above, the middle mold 200 may support the diffuser plate 80, the optical sheet 60, and the display panel 20.

The middle mold 200 may include a restricting rib 240 supporting side surfaces of the display panel 20 to restrict the display panel 20 from departing from the middle mold 200.

The display panel 20 may be supported by the top chassis 100 rested on a front portion of the middle mold 200 and coupled with the middle mold 200 in front of the display panel 20.

That is, the display panel 20 may be supported by the top chassis 100 and the middle mold 200 in a first direction X which is a front-rear direction of the display panel 20.

The restricting rib 240 of the middle mold 200 may prevent the supported display panel 20 from being spaced in a second direction Z or a third direction Y that is orthogonal to the first direction X.

Accordingly, the restricting rib 240 may contact the side surfaces of the display panel 20 to support the side surfaces of the display panel 20 in the second direction Z or the third direction Y, or the restricting rib 240 may be spaced a small distance from the side surfaces of the display panel 20.

A process of assembling the display apparatus 1 may include a process of sequentially stacking the diffuser plate 80, the optical filter 60, and the display panel 20 in the front direction of the middle mold 20 and then pressing the top chassis 100 in the first direction X in the state in which the diffuser plate 80, the optical filter 60, and the display panel 20 are stacked on the middle mold 200 to thereby couple the middle mold 200 with the top chassis 100.

Before the top chassis 100 is assembled, the display panel 20 may depart from a first position A being a correct position at which the display panel 20 is rested on the middle mold 200, and thus be located at a second position B at which at least one portion of the display panel 20 is placed on a top end of the restricting rib 240.

As described above, the restricting rib 240 may be positioned adjacent to the side surfaces of the display panel 20 or be in contact with the side surfaces of the display panel 20. Therefore, when the display panel 20 is stacked in the front direction of the middle mold 200, the display panel 20 may be located at the second position B although the display panel 20 departs from the first position A by a preset distance.

As illustrated in FIG. 4, when the top chassis 100 is pressed in the first direction X and assembled with the middle mold 200 in the state in which the display panel 20 is located at the second position B, a portion of the display panel 20 placed on the top end of the restricting rib 240 may collide with a rear surface of the bezel portion 100a of the top chassis 100, and accordingly, the display panel 20 may be damaged.

Because a crack formed in a portion of the display panel 20 disables driving of the display panel 20, such a damage of the display panel 20, which may be generated when the top chassis 100 is assembled with the middle mold 200, may be a great problem in an assembly process of the display apparatus 1.

Hereinafter, the display apparatus 1 according to an embodiment of the disclosure, which is capable of preventing the display panel 20 from being damaged when the top chassis 100 is assembled with the middle mold 100 in the state in which the display panel 20 is located at the second position B, will be described.

Figure 5:
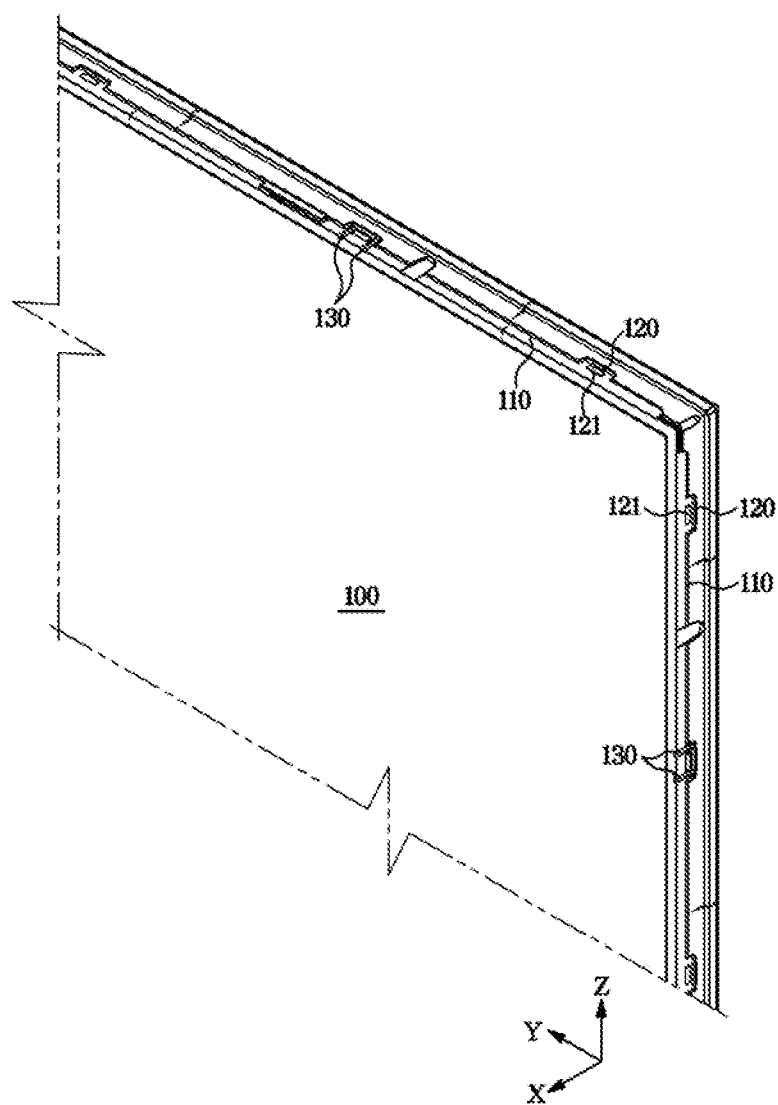
FIG. 5 is a rear perspective view illustrating a portion of a top chassis according to an embodiment of the disclosure.
Figure 6:
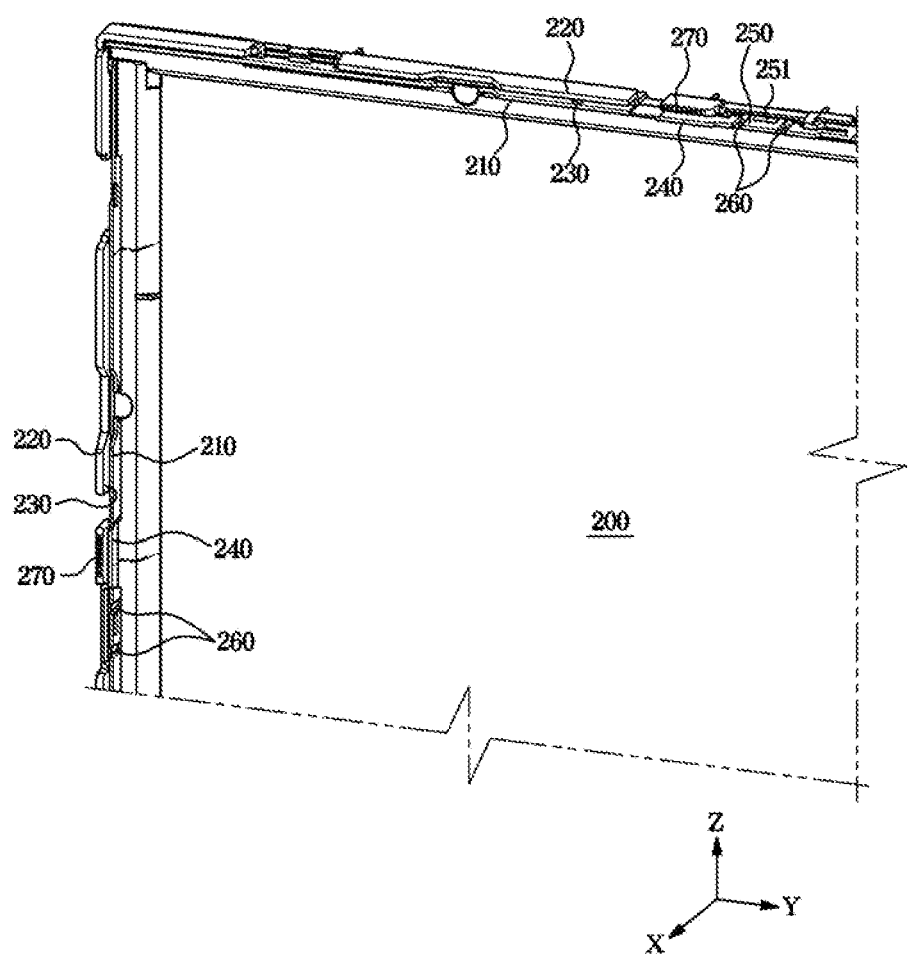
FIG. 6 is a perspective view illustrating a portion of a middle mold according to an embodiment of the disclosure.
Figure 7:
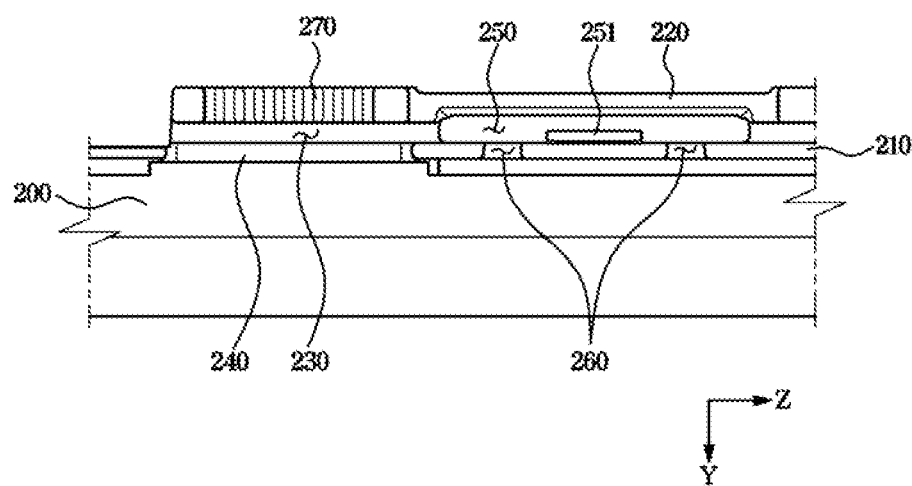
FIG. 7 is a front view illustrating a portion of a middle mold according to an embodiment of the disclosure.
Figure 8:
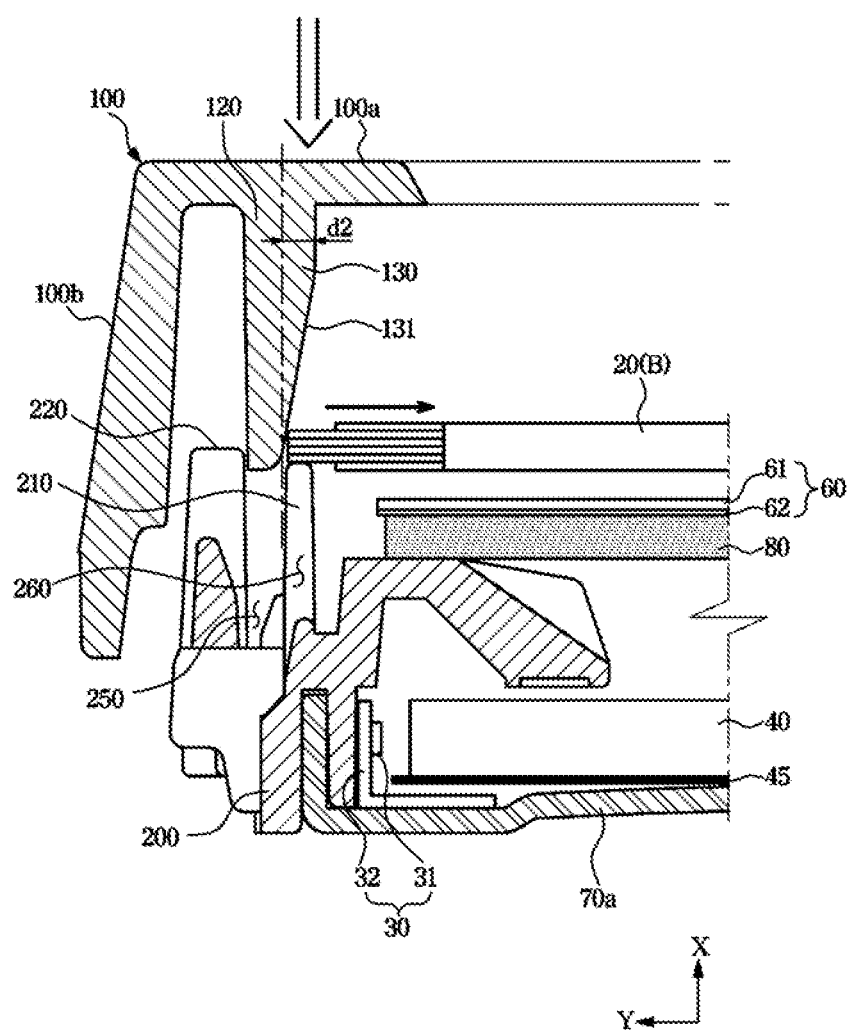
FIG. 8 is a side cross-sectional view of some configurations when a display apparatus according to an embodiment of the disclosure is assembled.
Figure 9:
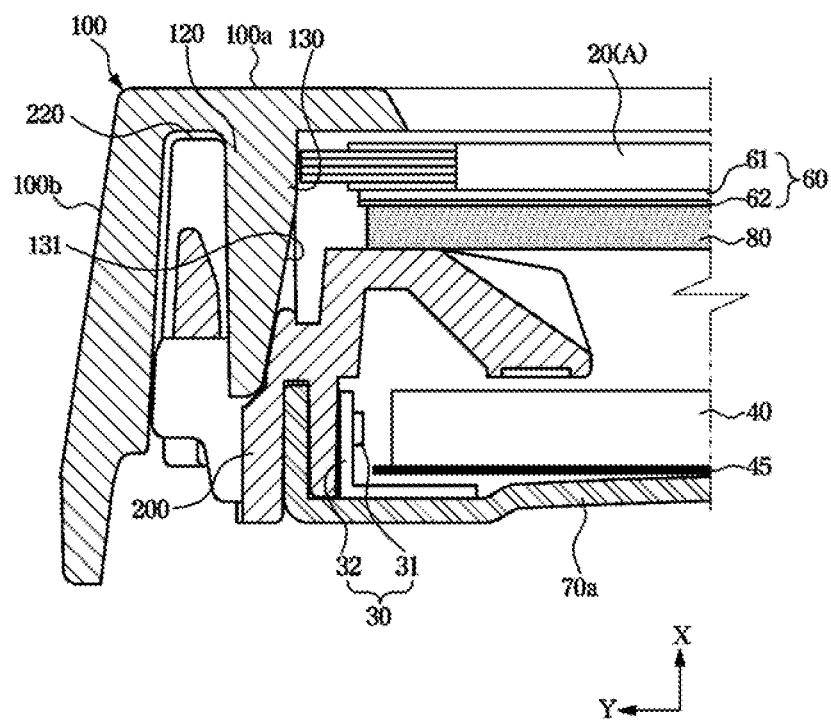
FIG. 9 is a side cross-sectional view of some configurations after a display apparatus according to an embodiment of the disclosure is assembled.

FIG. 5 is a rear perspective view illustrating a portion of a top chassis according to an embodiment of the disclosure, FIG. 6 is a perspective view illustrating a portion of a middle mold according to an embodiment of the disclosure, FIG. 7 is a front view illustrating a portion of a middle mold according to an embodiment of the disclosure, FIG. 8 is a side cross-sectional view of some configurations when a display apparatus according to an embodiment of the disclosure is assembled, and FIG. 9 is a side cross-sectional view of some configurations after a display apparatus according to an embodiment of the disclosure is assembled.

The top chassis 100 of the display apparatus 1 according to an embodiment of the disclosure may include a pressing rib 130 for moving, when the display panel 20 is located at the second position B upon assembling of the top chassis 100, the display panel 20 to the first position A to couple the display panel 20 with the middle mold 200.

As illustrated in FIGS. 5 to 7, the top chassis 100 may include an insertion rib 110 that is inserted into the middle mold 200 when the top chassis 100 is coupled with the middle mold 200. The insertion rib 110 may protrude in the first direction X from the rear surface of the bezel portion 100a of the top chassis 100.

The insertion rib 110 may extend in the first direction X in a shape of a closed loop, although not limited thereto. However, a plurality of insertion ribs 110 may be positioned on the rear surface of the bezel portion 100a of the top chassis 100.

The middle mold 200 may include an insertion groove 230 in which the insertion rib 110 is inserted.

The insertion groove 230 may have a shape corresponding to the insertion rib 110 that is inserted in the first direction X. The insertion groove 230 may be a space formed between a first rib 210 and a second rib 220 that protrude in the first direction X.

The first rib 210 and the second rib 220 may protrude in the first direction X, while being arranged in parallel.

The first rib 210 and the second rib 220 may be in a shape of ribs extending in the second direction Z and the third direction Y.

The ribs 210 and 220 may be a plurality of ribs 210 and 220 arranged in the second direction Z and the third direction Y, instead of being formed in the shape of a closed loop.

When the top chassis 100 is coupled, the insertion rib 110 may be inserted into the insertion groove 230 formed by the first rib 210 and the second rib 220, and supported by the first rib 210 or the second rib 220, so that stable coupling is maintained.

The top chassis 100 may include a hook 120 that is hook-coupled with the middle mold 200. That is, the top chassis 100 may be coupled with the middle mold 200 by hook-coupling of the hook 120.

The hook 120 may extend in the first direction X from an end of the insertion rib 110. A plurality of hooks 120 may extend from the end of the insertion rib 110.

The plurality of hooks 120 may be arranged in the second direction Z or the third direction Y. The plurality of hooks 120 may have the same shape, and therefore, one hook 120 positioned in a left side of the display apparatus 1 will be described.

Also, only configurations corresponding to the one hook 120 among configurations related to the hook 120, such as a hook insertion groove 250 in which the hook 120 is inserted, will be described, and overlapping descriptions will be omitted.

The middle mold 200 may include the hook insertion groove 250 in which the hook 120 is inserted. The hook insertion groove 250 may be provided inside the insertion groove 230.

The hook insertion groove 250 may be concave toward an inner portion of the middle mold 200 than the insertion groove 230 in the first direction X. Because the hook 120 extends from the end of the insertion rib 110, the hook 120 may be inserted more deeply in the middle mold 200 than the insertion rib 110.

Also, because the hook 120 extends from the end of the insertion rib 110, the hook insertion groove 250 in which the hook 120 is inserted may be positioned inside the insertion groove 230.

Inside the hook insertion groove 250, a coupling protrusion 251 with which the hook 120 inserted in the hook insertion groove 250 is hook-coupled may be provided. When the hook 120 is inserted into the hook insertion groove 250, the hook 120 may be hooked with the coupling protrusion 251 to couple the top chassis 100 with the middle mold 200.

The coupling protrusion 251 may protrude from an outer side surface of the first rib 210 toward the second rib 220, although not limited thereto. However, the coupling protrusion 251 may protrude from an inner side surface of the second rib 220 toward the first rib 210.

The hook 120 may include a hook groove 121 in which the coupling protrusion 251 is inserted. When the coupling protrusion 251 is inserted into the hook groove 121, the hook 120 may be hook-coupled with the coupling protrusion 251.

The restricting rib 240 may be positioned adjacent to the first rib 210. More specifically, the restricting rib 240 may be positioned on the substantially same line in the third direction Y with respect to the second direction Z in which the first rib 210 extends.

The restricting rib 240 may be positioned more adjacent to the side surface of the display panel 20 than the first rib 210.

As described above, the restricting rib 240 may be a configuration for supporting or restricting the side surface of the display panel 20, and may be positioned more adjacent to the side surface of the display panel 20 than the first rib 210. Accordingly, although the display panel 20 departs from the correct position A, the display panel 20 may contact the restricting rib 240 to be restricted from departing.

Because the restricting rib 240 is positioned most adjacent to the side surface of the display panel 20, at least one portion of the display panel 20 may be easily placed on the top end of the restricting rib 240 due to an external force applied when the display panel 20 is stacked on the middle mold 200 upon assembling of the display apparatus 1.

Unlike typical techniques, display apparatuses with minimized bezel portions are lately being developed to improve an esthetic sense. Accordingly, there may be a problem that distances between first ribs and restricting ribs are very small.

That is, due to a narrow width of a bezel portion, first ribs and restricting ribs positioned in the front-rear direction on an area of the bezel portion may be on the substantially same line.

Even when the display apparatus 1 is implemented as a bezelless display apparatus, the restricting rib 240 may be positioned more adjacent to the side surface of the display panel 20 than the first rib 210.

The hook insertion groove 250 in which the hook 120 is inserted may be positioned adjacent to the restricting rib 240, which will be described later. The reason may be to locate the display panel 20 at the first position A by easily pressing the display panel 20 placed on the top end of the restricting rib 240 with the pressing rib 130 formed in the hook 120.

The pressing rib 130 may be formed at the hook 120. More specifically, the pressing rib 130 may protrude toward the third direction Y from an inner side surface of the hook 120 that is positioned adjacent to the first rib 210 when the hook 120 is coupled with the middle mold 200.

As described above, the first rib 210 and the restricting rib 240 may be located at the substantially same position. Therefore, when the display panel 20 is placed on the top end of the restricting rib 240 and the pressing rib 130 is pressed in the first direction X toward the middle mold 200, the pressing rib 130 may press the side surface of the display panel 20 placed on the top end of the restricting rib 240 to move the display panel 20 to the first position A.

More specifically, as illustrated in FIGS. 7 to 9, in the state in which the display panel 20 is located at the second position B at which at least one portion of the display panel 20 is placed on the top end of the restricting rib 240, the top chassis 100 may be assembled.

The top chassis 100 may be pressed in the first direction X and thus move adjacent to the middle mold 200. At this time, the hook 120 most protruding in the first direction X among configurations coupled with the middle mold 200 may be first positioned adjacent to the middle mold 200.

The pressing rib 130 may be positioned on the inner side surface of the hook 120, and the pressing rib 130 may press the side surface of the display panel 20 when the top chassis 100 moves in the first direction X.

The pressing rib 130 may protrude in the third direction Y, and include an inclined surface 131 inclined in the third direction Y.

The inclined surface 131 may be inclined in the first direction X from an end of the hook 120, and a thickness d2 of the pressing rib 130 may increase in a direction toward the top chassis 100.

That is, the pressing rib 130 may be inclined to have the thickness d2 increasing from the end of the hook 120 toward the bezel portion 100a of the top chassis 100.

The pressing rib 130 may press the side surface of the display panel 20 along the inclined surface 131 when the top chassis 100 moves toward the middle mold 200.

That is, as the inclined surface 131 moves adjacent to the middle mold 200 together with the top chassis 100, the thickness d2 of the inclined surface 131 may increase gradually from at the same height as the top end of the restricting rib 240 with respect to the first direction X, and accordingly, the pressing rib 130 may press the display panel 20 in a direction of the thickness d2.

The first rib 210 may include a guide 260 for guiding the pressing rib 130 to be inserted in the first direction X. As described above, the pressing rib 130 may protrude toward the third direction Y from the hook 120, and when the hook 120 is inserted into the hook insertion groove 250, the hook 120 may be restricted from being inserted into the hook insertion groove 250 due to the thickness d2 of the pressing rib 130.

That is, because the pressing rib 130 protrudes in the third direction Y, the pressing rib 130 may contact, when the hook 120 moves in the first direction X, the top end of the first rib 210 due to the thickness d2 of the pressing rib 130 to restrict the hook 120 from being inserted into the hook insertion groove 250.

Accordingly, when the hook 120 moves in the first direction X at the top end of the first rib 210 to be inserted into the hook insertion groove 250, the pressing rib 130 may be inserted into the guide 260 passing the pressing rib 130 without contacting the first rib 210 for the hook 120 to be inserted into the hook insertion groove 250 and hook-coupled, and accordingly, the top chassis 100 may be coupled with the middle mold 200.

The guide 260 may be in a shape of an incision cut in the first direction X from the end of the first rib 210. The guide 260 may be cut in the second direction Z by a length corresponding to a width of the pressing rib 130.

The guide 260 may be cut in the first direction X in which the pressing rib 130 moves, and may be cut in the first direction X by a length of the pressing rib 130 in the first direction X.

As described above, the hook insertion groove 250 may be positioned adjacent to the restricting rib 240. Accordingly, when the display panel 20 is located at the second position B and thus at least one portion of the display panel 20 is placed on the top end of the restricting rib 240, the hook 120 may be inserted into the hook insertion groove 250, and the side surface of the display panel 20 may be pressed in the third direction Y by the pressing rib 130 moving together with the hook 120.

Accordingly, the portion of the display panel 20, positioned adjacent to the hook insertion groove 250 and placed on the top end of the restricting rib 240, may also move by pressing of the pressing rib 130, and thus the display panel 20 may be located at the correct position A.

The thickness d2 of the pressing rib 130 may correspond to a thickness d1 (see FIG. 4) of the restricting rib 240 or may be thinner than the thickness d1 of the restricting rib 240.

Accordingly, when the hook 120 is coupled with the hook insertion groove 250, the inclined surface 131 of the pressing rib 130 may be positioned at a location corresponding to the restricting rib 240 and the side surface of the display panel 20, or may be further spaced from the side surface of the display panel 20, than from the restricting rib 240.

A length of a width in second direction Z of the pressing rib 130 may be short, and accordingly, a cross-sectional area of the pressing rib 130 may be small. Meanwhile, the restricting rib 240 may extend in the second direction Z, and a cross-sectional area of the restricting rib 240 extending in the second direction Z may be wider than that of the pressing rib 130.

When the display panel 20 moves, a case in which the display panel 20 is supported by the pressing rib 130 may have higher probability that the side surface of the display panel 20 will be damaged than a case in which the display panel 20 is supported by the restricting rib 240, due to the small cross-sectional area of the pressing rib 130.

Accordingly, the restricting rib 240 may be positioned more adjacent to the side surface of the display panel 20 than the pressing rib 130, thereby more stably supporting the side surface of the display panel 20.

The middle mold 200 may include an indicator rib 270 indicating a location of the restricting rib 240.

The indicator rib 270 may be positioned on the substantially same line as the restricting rib 240 in the third direction Y. The indicator rib 270 may protrude in the first direction X from the second rib 220.

That is, the indicator rib 270 may be opposite to the restricting rib 240 with respect to the insertion groove 230 (see FIG. 7).

The indicator rib 270 may be thicker than the restricting rib 240.

In a top end of the indicator rib 270, a plurality of bending portions may be formed toward the first direction X.

The indicator rib 270 may enable an assembler to easily recognize a location of the restricting rib 240 with his/her naked eye through the indicator rib 270, in an assembly process of the display apparatus 1.

The middle mold 200 may be formed with a single color, and accordingly, it may be difficult to recognize a location of the restricting rib 240 with the naked eye. Accordingly, by positioning the indicator rib 270 that is thicker than the restricting rib 240 and may be easily recognized by an assembler's naked eye through the bending portions formed thereon, adjacent to the restricting rib 240, the assembler may easily recognize the location of the restricting rib 240 through the indicator rib 270.

Accordingly, the assembler may check the indicator rib 270 before assembling the top chassis 100 into the middle mold 200 to easily determine whether a portion of the display panel 20 is placed on the top end of the restricting rib 240.

So far, specific embodiments have been shown and described. However, the disclosure is not limited to the above-described embodiments, and various modifications can be made by those skilled in the art without departing from the gist of the technical idea of the disclosure defined by the claims below.

The invention claimed is:

1. A display apparatus comprising:
    a display panel displaying an image in a front direction;
    a middle mold causing the display panel to be rested at a first position; and
    a chassis coupled with the middle mold in front of the display panel,
    wherein the middle mold comprises:
        a support rib forming a portion of an insertion groove,
        a restricting rib configured to restrict the display panel from moving in a side direction to restrict the display panel from departing from the first position, and
        a hook insertion groove located inside the insertion groove,
    wherein the chassis comprises:
        an insertion rib inserted into the insertion groove when the chassis is coupled with the middle mold,
        a hook hook-coupled with the middle mold and inserted into the hook insertion groove, and
        a pressing rib positioned on an inner surface of the hook,
    wherein the middle mold further comprises a guide configured to guide the pressing rib passing through the guide when the hook is inserted into the hook insertion groove,
    wherein the pressing rib comprises an inclined surface inclined such that a thickness of the pressing rib increases in a direction toward the chassis from an end of the pressing rib, and
    wherein the inclined surface presses, when the chassis is coupled with the middle mold, the display panel positioned out of the first position toward the first position.

2. The display apparatus of claim 1, wherein the restricting rib is positioned more adjacent to a side surface of the display panel than the support rib.

3. The display apparatus of claim 2, wherein the middle mold further comprises a coupling protrusion positioned on the support rib and hooked with the hook.

4. The display apparatus of claim 3, wherein the hook further comprises a hook groove into which the coupling protrusion is inserted when the hook is coupled with the middle mold, and the pressing rib is formed on the same surface as the hook groove.

5. The display apparatus of claim 1, wherein the guide guides the pressing rib to be inserted in a direction of being coupled with the middle mold, when the hook is inserted into the hook insertion groove.

6. The display apparatus of claim 5, wherein the guide is formed by cutting a portion of an end of the support rib.

7. The display apparatus of claim 1, wherein the restricting rib is positioned more adjacent to a side surface of the display panel than the pressing rib, when the chassis is coupled with the middle mold.

8. The display apparatus of claim 1, wherein the thickness of the pressing rib corresponds to a thickness of the restricting rib or is thinner than the thickness of the restricting rib.

9. The display apparatus of claim 1, wherein, when the display panel is located at a second position at which at least one portion of the display panel is placed on a top end of the restricting rib, the pressing rib presses the display panel toward the first position, while being coupled with the middle mold.

10. The display apparatus of claim 9, wherein the support rib and the guide are located at corresponding positions in a direction in which the support rib extends.

11. The display apparatus of claim 1, wherein the middle mold further comprises an indicator rib positioned adjacent to the support rib.

12. The display apparatus of claim 11, wherein the indicator rib is opposite to the support rib with respect to the insertion groove.

* * * * *